Sept. 3, 1968 A. J. TESTA 3,400,094
GASKET-FORMING COMPOSITIONS CONTAINING A MIXTURE OF
UNSATURATED FATTY ACID AMIDES AS A
TORQUE CONTROL AGENT
Filed Dec. 22, 1965

INVENTOR.
ANTHONY J. TESTA
BY
ATTORNEY 3,400,094
GASKET-FORMING COMPOSITIONS CONTAINING A MIXTURE OF UNSATURATED FATTY ACID AMIDES AS A TORQUE CONTROL AGENT
Anthony J. Testa, Westwood, Mass., assignor to W. R. Grace & Co., Cambridge, Mass., a corporation of Connecticut
Filed Dec. 22, 1965, Ser. No. 515,585
6 Claims. (Cl. 260—32.6)

ABSTRACT OF THE DISCLOSURE

A gasket-forming composition for container closure elements composed of a vinyl resin plastisol which includes a torque control additive consisting essentially of a mixture of 80% erucyl amide, 12% gadoleyl amide and 8% oleyl amide.

---

Figure 1:
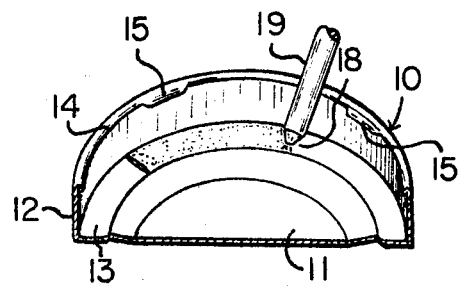

This invention relates to compositions suitable for use as gaskets in rotatable closures. In a particular aspect, it relates to a vinyl resin sealing composition which includes an additive to endow the resulting gasket with low removal torque values.

Rotatable closures are usually made of lacquered tinplate or aluminum and have gained extensive use in protecting and preserving foods in glass containers. To be effective, the closure requires a gasket to easily seal the contained food, and it must not contain any deleterious substance that might transfer to and contaminate the food. Typical rotatable closures include the screw type and lug type, and they differ chiefly in the means by which the closure is held firmly in place on the container. Illustrative means include a continuous or discontinuous thread, projecting lugs, etc., located near the container opening, and they are adapted to mate in threaded engagement with the closure as it is rotatably advanced to bring the gasket into sealing relationship with the mouth of the container.

In sealing a jar with a closure, air is exhausted from the headspace above the contents in closing machines which produces a vacuum either mechanically or by the condensation of steam. In closing the container, the torque must be sufficient to resist retractive movement during shipment and/or storage as such movement is apt to break the seal and cause leaks through which spoilage organisms can gain access to the contents in the container.

The torque which is required for closure removals on vacuum-packed containers varies widely, but it is well known that some containers, such as baby food jars, have their caps so firmly attached that it is necessary to resort to fairly drastic means to effect their removal. On the other hand, closures may be so loosely attached that only a slight twist is required to remove it from the container. This is objectionable because the container is subject to tampering by customers who remove the closure when the container is stored on shelves in the market to examine the contents. It is apparent that such opening breaks the seal and exposes the contents to the atmosphere with the result that spoilage will gradually occur. Another objection is that a loosely-fitted closure may be accidentally jarred, causing the seal to be broken and concomitantly therewith result in exposure of the contents to contamination.

It is, therefore, an object of this invention to provide a composition which is suitable for use as a gasket in a rotatable closure which maintains a hermetic seal but has low removal torque requirements. This objective is achieved by incorporating into the composition an additive consisting of a mixture of fatty acid amides composed of a major amount of erucyl amide and minor amounts of oleyl and gadoleyl amide. Specifically, the mixture consists of 80% erucyl amide, 12% gadoleyl amide and 8% oleyl amide, by weight. The additive not only imparts low removal torque values to the gasket but also provides the gasket with a smooth release property.

Closure manufacturers design their gaskets with the prime consideration of preventing accidental dislodgement of the closure. This requires formulation of the gasket-forming composition to be somewhat tacky so that it exhibits considerable friction to the closure and the container against rotational torque. But, this is precisely what makes these closures difficult to open for the average consumer. By including the additive of this invention in the gasket, the frictional forces which exist between the gasket and the container are appreciably reduced without impairing the sealing efficiency.

Plastisols are frequently used to form gaskets for closures. These compositions basically comprise a vinyl resin dispersed in a plasticizer in which the resin is insoluble at room temperature but which is capable of solvating the resin at an elevated temperature. The properties of these compositions may be modified by the addition of conventional ingredients, such as fillers, stabilizers, pigments and other additives.

The torque control additive which is included in the plastisol composition is largely incompatible with the resin and the plasticizer. It is possessed of limited compatibility, however, so that it remains within the body of the gasket when it is relaxed or uncompressed. As the gasket is subjected to pressure when the closure is brought into sealing relationship with a container, a portion of the additive migrates to the surface of the gasket and reduces the friction between the gasket and the lip of a container.

Figure 2:
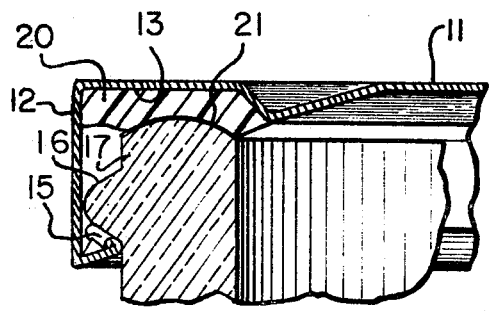

In the drawing:
FIG. 1 is a perspective sectional view showing the application of a gasket-forming composition by means of a nozzle in the peripheral channel of an inverted lug-type closure.
FIG. 2 is a fragmentary vertical sectional view of a closure in sealed relationship with a container.

The closure, shown generally at 10, comprises a circular panel 11 and a skirt 12 depending from the periphery of the panel. A gasket-receiving channel 13 is provided in the parimetrical margin of the panel adjacent the lower edge of the skirt. The upper edge of the skirt is curved inwardly to form a bead 14 into which are formed a series of spaced lugs 15. These lugs register with the thread 16 (shown in FIG. 2) formed on the neck of the container 17 and lock the closure in place.

The inner surface of the closure is usually coated with a protective film of a varnish or a lacquer, and the gaskets are generally formed from liquid compositions by a lining technique. In the lining operation (FIG. 1), the closure is positioned over a rotating chuck (not shown) and the composition 18 flows through a nozzle 19 into the channel 13. The closure is spun by the chuck and the composition is distributed as a narrow band in the channel. The lined closures are then passed to a heated oven maintained at a temperature sufficiently high to flux the composition which, when cooled, solidifies to a permanent rubber-like gasket 20 (as shown in FIG. 2). The fluxing step is generally carried out by continuously advancing the lined closures through an oven on a wire mesh belt, and the advance is so synchronized that a residence time in the oven of about 60 seconds is sufficient to flux the composition.

In applying a gasketed closure to a container, the gasket surface is initially dry to the touch, and as the closure is progressively advanced on the container, the increased pressure results in a corresponding increase in exudation of additive to the surface. The greater the pressure the greater is the exudation, and migration of the additive continues until the closure is brought into sealing contact with the container. The resulting surface layer of additive, shown as an exaggerated film 21 in FIG. 2, remains on the gasket so long as the sealing relationship is maintained. The additive thus acts as a lubricant by reducing the frictional forces which exist between it and the container and, consequently, less torque is required to remove the closure. As the closure is being removed, the additive is gradually reabsorbed into the body of the gasket and it is completely reabsorbed when the closure is finally removed.

Vinyl resin plastisols are particularly suitable for use in forming the gaskets. These include plasticized homopolymers of vinyl chloride and copolymers of vinyl chloride with up to 20% by weight of another monomer copolymerizable therewith. Suitable monomers include acrylonitrile, vinylidene chloride, vinyl acetate, and dialkyl maleates. Typical copolymers include 95 percent vinyl chloride–5% vinyl acetate; 95 percent vinyl chloride–5% dialkyl maleate; and 94 percent vinyl chloride–6% vinylidene chloride. The preferred resin is plasticized polyvinyl chloride.

The plasticizers which may be used in the gasket-forming compositions include dialkyl phthalates, alkyl phthalyl alkyl glycolates, dialkyl esters of alkane dicarboxylic acids, acetyl trialkyl citrates, and trialkyl and triaryl phosphates. Particular plasticizers which may be employed include dioctyl phthalate (di-2-ethylhexyl phthalate), octyl decyl phthalate, ethyl phthalyl ethyl glycolate, butyl phthalyl butyl glycolate, diisobutyl adipate, dibutyl sebacate, acetyl dibutyl citrate, trioctyl phosphate and tricresyl phosphate. Other useful plasticizers include alkyl esters of fatty acids, such as octyl stearate; epoxidized triglycerides, such as epoxidized soybean oil; and polymeric polyester plasticizers, such as polymeric glycol adipate.

Various other additives may be included to modify the plastisol compositions. These include fillers, such as anhydrous calcium sulfate, talc, wood flour, diatomaceous earth and asbestos; stabilizers, such as tetrasodium pyrophosphate, tribasic lead silicate, calcium stearate, zinc stearate, dibasic lead stearate and organo-tin complexes; pigments, such as carbon black, titanium dioxide and aluminum powder; and dispersing agents such as zinc resinate, lecithin, glycol stearate, propylene glycol laurate and glycerol monooleate.

The proportions of the torque control additive are included in the gasket-forming composition in amounts sufficient to insure incompatibility in the plastisol system and will vary with the relative proportions and properties of the other components. In general, the amount of additive should range between about 1 and 18, preferably between about 3 and 12, parts by weight per hundred parts of resin. As a rule, no additive will be observed on the surface of the fluxed, uncompressed gasket, but it will appear when compression of the gasket exceeds 20 pounds per square inch. Unless an excessive amount of additive is used, the amount that will migrate with time is negligible, and the surface of the gasket will remain dry and tack-free.

Representative gasket-forming compositions which included the torque control additive of this invention were prepared for comparative purposes with identical compositions containing oleyl amide, which is a mixture consisting of 91% oleamide, 6% stearamide and 3% linoleamide (Armid O). The torque control additive of this invention which is reported in Table I consisted of 80% erucyl amide, 12% gadoleyl amide, and 8% oleyl amide. The formulations were composed as follows:

TABLE I

| Ingredient | Example No. (parts by weight) | | | | | |
|---|---|---|---|---|---|---|
| | 1 | 2 | 3 | 4 | 5 | 6 |
| Polyviny. chloride | 100 | 100 | 100 | 100 | 100 | 100 |
| Dioctyl phthalate | 48 | 48 | 48 | 48 | 48 | 48 |
| Epoxidized soy bean oil | 20 | 20 | 20 | 20 | 20 | 20 |
| Titanium dioxide | 5 | 5 | 5 | 5 | 5 | 5 |
| Oleyl amide (Armid O) | 3.5 | 7.0 | 10.5 | | | |
| Torque control additive (this invention) | | | | 3.5 | 7.0 | 10.5 |

Each composition was deposited in the annular channel of a 63 mm. rotatable lug-type metal closure and fluxed in an oven at a temperature of 395° F. and a residence time of 1 minute.

Each closure containing the fluxed gasket was placed on a 12 oz. glass jar containing a representative pack of cold fill, steam closed olives. The turndown torque to seal each container was 25 inch-lbs. which is customarily employed in commercial closure-applying machines. The closed containers were stored for one week at a temperature of 100° F. and the closures were then tested for ease of removal. The results of the tests are shown in Table II.

TABLE II

| Example No. | Removal torques (inch-lbs.) |
|---|---|
| 1 | 33 |
| 2 | 25 |
| 3 | 28 |
| 4 | 22 |
| 5 | 26 |
| 6 | 23 |

It is noted that the inclusion of the torque control additive of this invention provided relatively low removal torques while the torque necessary to remove the closure from containers which included oleyl amide (Armid O) in the gasket increased after a one-week storage period. This is significant in that the frictional forces are reduced without adversely affecting the seal between the gasketed closure and the container. It was further noted that the torque control additive of this invention, which has a molecular weight of about 335, did not migrate to the gasket surface as readily as lower molecular weight torque control agents. This is also significant because it does not transfer to the glass finish of the container and thus minimizes the possibility of acting as a focal point for collecting dust particles.

I claim:

1. A gasket-forming composition comprising a vinyl resin, plasticizer therefor, and between about 1 and 18 parts by weight based on 100 parts by weight of the resin of a torque control additive consisting of a mixture of 80% erucyl amide, 12% gadoleyl amide and 8% oleyl amide by weight.

2. A composition according to claim 1 wherein the additive is present in amounts ranging between about 3 and 12 parts by weight per 100 parts of resin.

3. A composition according to claim 2 wherein the resin is polyvinyl chloride.

4. A closure comprising a cap adapted to be rotatably attached to a container opening and a rubber-like gasket positioned in the cap to register in sealing relationship with the lip of the container, said gasket comprising a fluxed plastisol of a vinyl resin containing between about 1 and 18 parts by weight based on 100 parts by weight of the resin of a torque control additive consisting of a mixture of 80% erucyl amide, 12% gadoleyl amide and 8% oleyl amide by weight.

5. A closure according to claim 4 wherein the additive is present in amounts ranging between about 3 and 12 parts by weight per 100 parts of resin.

6. A closure according to claim 5 wherein the resin is polyvinyl chloride.

References Cited

UNITED STATES PATENTS 2,938,879 5/1960 Mock et al. _____ 260—32.6
3,142,401 7/1964 Foss et al. _____ 260—32.6

FOREIGN PATENTS 703,295 2/1965 Canada.

MORRIS LIEBMAN, *Primary Examiner.*

L. T. JACOBS, *Assistant Examiner.*